(12) United States Patent
Geller

(10) Patent No.: US 9,091,905 B2
(45) Date of Patent: Jul. 28, 2015

(54) SYSTEM WITH FLASHLIGHT AND CONTINUOUS LIGHT REFLECTOR ARM FOR FIXING TO A PHOTOGRAPHIC APPARATUS OR A CAMERA

(76) Inventor: Wolfgang-Peter Geller, Garlstorf (DE)

( * ) Notice: Subject to any disclaimer, the term of this patent is extended or adjusted under 35 U.S.C. 154(b) by 95 days.

(21) Appl. No.: 13/641,607

(22) PCT Filed: Dec. 8, 2010

(86) PCT No.: PCT/EP2010/069187
§ 371 (c)(1),
(2), (4) Date: Oct. 16, 2012

(87) PCT Pub. No.: WO2011/134550
PCT Pub. Date: Nov. 3, 2011

(65) Prior Publication Data
US 2013/0038786 A1 Feb. 14, 2013

(30) Foreign Application Priority Data
Apr. 26, 2010 (DE) .................... 20 2010 006 106 U

(51) Int. Cl.
*H04N 5/225* (2006.01)
*G03B 15/03* (2006.01)
*G03B 15/06* (2006.01)
*G03B 17/56* (2006.01)

(52) U.S. Cl.
CPC ............... *G03B 15/03* (2013.01); *G03B 15/06* (2013.01); *G03B 17/568* (2013.01)

(58) Field of Classification Search
CPC ........ G03B 15/05; G03B 17/48; G03B 17/56; G03B 17/566; G03B 2215/05–2215/0596; G03B 2217/00; G03B 2217/002; H04M 1/0264

USPC ........... 348/371, 373, 375, 376; 396/174, 175
See application file for complete search history.

(56) References Cited

U.S. PATENT DOCUMENTS

| | | |
|---|---|---|
| 3,781,535 A | 12/1973 | Larson |
| 3,821,764 A | 6/1974 | Shelton |
| 3,967,106 A * | 6/1976 | Chen ................................. 362/4 |
| 4,078,170 A | 3/1978 | Sloop |
| 4,091,402 A * | 5/1978 | Siegel ........................... 396/422 |
| 4,099,221 A * | 7/1978 | Carrillo ........................... 362/18 |
| 4,283,135 A | 8/1981 | Lupis |

(Continued)

FOREIGN PATENT DOCUMENTS

DE 3248200 8/1983

*Primary Examiner* — Lin Ye
*Assistant Examiner* — Chriss Yoder, III
(74) *Attorney, Agent, or Firm* — Sand & Sebolt

(57) ABSTRACT

A system comprising a flashlight and continuous light reflector arm for fixing to a photographic apparatus, a flashlight, a continuous light unit, or to film or video cameras. Flash units are often mounted centrally onto a camera causing the flash to come from the same direction from which the photograph is taken. The system allows targeted illumination from a direction different from that from which the photograph is taken, does not require complicated measures with regard to flash control, manages with comparatively little light power and does not further influence the center of gravity of the camera. The system is composed of camera and flashlight or continuous light unit, including a fixing arm fixed to the photographic apparatus by a fixing means and includes means for fixing a reflection element, wherein the reflector arm is designed such that the reflection means is positioned laterally alongside the photographic apparatus.

22 Claims, 3 Drawing Sheets

(56) References Cited

U.S. PATENT DOCUMENTS

| | | | | |
|---|---|---|---|---|
| 4,443,837 A * | 4/1984 | Migliori et al. | | 362/396 |
| 5,839,006 A * | 11/1998 | Beckerman | | 396/174 |
| 7,783,188 B2 * | 8/2010 | Clark | | 396/198 |
| 7,801,438 B2 * | 9/2010 | Khuntia | | 396/174 |
| 2003/0201005 A1 * | 10/2003 | Hilmersen | | 135/16 |
| 2006/0093348 A1 * | 5/2006 | Squillace | | 396/422 |
| 2008/0175581 A1 * | 7/2008 | Yasutomi et al. | | 396/174 |
| 2011/0129210 A1 * | 6/2011 | McGucken | | 396/422 |

* cited by examiner

SYSTEM WITH FLASHLIGHT AND CONTINUOUS LIGHT REFLECTOR ARM FOR FIXING TO A PHOTOGRAPHIC APPARATUS OR A CAMERA

TECHNICAL FIELD

The present invention relates to a system comprising a flashlight and continuous light reflector arm for fixing to a photographic apparatus and a flashlight and continuous light unit. The invention can also be used in the case of film and video cameras.

PRIOR ART

Carefully chosen illumination of an object is a basic prerequisite for successful photographs. For this purpose, various flash units and reflectors can be set up in the area or held by individuals. This is comparatively laborious. The use of reflectors in macro photography is known from the document U.S. Pat. No. 4,283,135, for example, which discloses a macro rail with slots for object, background and reflectors.

Therefore, flash units are often mounted centrally onto a camera. This causes the flashlight to come from the same direction from which the photograph is taken, too, thus oriented along the camera axis. There are several options for avoiding the associated disadvantages such as lighting that appears "flat" and low contrast, and the red-eye effect. So, for example, a device can be mounted on the camera, with which the flashlight is disposed laterally next to the camera to which it is attached. While this can improve the angle of illumination and attain improved illuminations, this nevertheless has the disadvantage that the weight of the flash is likewise laterally displaced to the outside, making a fairly complicated and stabile support structure necessary. Moreover, a clearly discernible torsional movement is generated when holding the camera due to the laterally mounted weight of the stabile mounting and of the flash unit, which can have negative effects on photography. If a hand is placed beside the camera to support the weight, it cannot be used to operate the photographic apparatus. Furthermore, this induces a very asymmetrical hand position. Another disadvantage to this is the fact that the light measurement by the flash unit is now also performed from a lateral direction, and therefore the illumination for photographs cannot be optimally controlled from the direction of the photographic apparatus. Additionally, the photographic apparatus must be connected to the flash unit via a cable or an expensive and complicated remote control in order to obtain automatic functions. Moreover, the center of gravity of the camera is shifted, which leads to significantly poorer handling.

Alternatively, various devices that scatter, reflect or soften the light can be mounted on a flash that is centrally fitted on a photographic apparatus.

Thus, for example, the positioning of a reflector together with a flash unit on a stable structure far above the camera is known from the document U.S. Pat. No. 4,078,170. This also has the aforementioned disadvantage with regard to the weight and weight distribution. Moreover, the configurations shown have been selected such that an exposure measurement by the flash unit is not possible.

Furthermore, the flash can be bounced indirectly off of walls or the ceiling. All of these approaches induce relatively high light loss and a comparatively uncontrolled lighting situation.

SUMMARY OF THE INVENTION

Therefore, it is an object of the invention to provide a system which allows targeted illumination from a direction that deviates from the direction from which the photograph is taken, and at the same time does not require complicated measures with regard to flash control, manages with comparatively little light power and does not further influence the center of gravity of the camera already chosen by the manufacturer.

This object is achieved by means of a system having a camera and flashlight or continuous light unit, the system comprising a fixing arm, which can be fixed to the photographic apparatus or the video camera or flashlight or continuous light unit or a part rigidly attached to one of these with the aid of a fixing means, and a means for fixing a reflection element, wherein the reflection arm is designed such that when in a state of being fixed on the photographic apparatus, the reflection means can be positioned laterally alongside the photographic apparatus. Moreover, the system features a flashlight or continuous light unit.

The flashlight or continuous light unit features an exposure sensor, which takes measurements in a forward direction, that is, along the camera axis. Moreover, the flashlight or continuous light unit features a lamp housing that is designed for the task of emitting light to the side of the camera, thus generally is designed at an approximately 90° angle from the camera axis. Angles of 45° to 135°, and in particular from 60° to 120° from the camera axis, are also understood to be a lateral light emission.

A lamp housing is understood to be any mechanism for directional light output. As a rule, the light is thereby radiated in a defined spatial segment, in particular as a cone of light.

In an integrated solution, the flashlight or continuous light unit or the lamp housing and/or the exposure sensor can also be integrated into the camera accordingly.

Arranging a reflection means laterally alongside the camera makes it possible to mount the flash or continuous light centrally on the camera having an exposure sensor oriented along the camera axis, and to then direct the light laterally in the direction of the reflection means so that the light from the flashlight/continuous light unit is directed at the object to be illuminated via the reflection means. In so doing, a side lighting situation can be created. Reflection means include, for example, smooth surfaces, sheets of cardboard or the like. Other objects with multiple reflective surfaces or textured surfaces can also be used, however. Thus, three-dimensional reflective structures are conceivable in order to bundle (concave shape) or scatter (convex shape) the light.

A lateral configuration alongside the photographic apparatus is understood to be any configuration that is also situated laterally alongside the photographic apparatus. Thus the reflection means can be laterally disposed alongside the photographic apparatus however at the level of the flash, or somewhat swiveled forward or backward from a purely lateral position without abandoning the lateral configuration within the meaning of this invention. Rather than one that is pivoted backwards or forwards, a lateral configuration which is disposed at the level of the flash or at variable height, is preferable, however. It can also be provided for that the reflection means is disposed higher, that is, even higher than the flash/continuous light. This allows lighting situations such as those created by the sun, to be simulated, for example.

A lateral configuration may also be characterized by a light axis that deviates significantly from the camera axis, in particular by more than 1° to the side.

The flashlight/continuous light reflector arm according to the invention thus allows an exposure to light from the side, further below or further above, and therefore significantly increases the number of "more interesting" lighting situations available without great effort. In so doing, the red-eye effect (the pupils of the person being photographed with a flash are portrayed with red-colored eyes) is significantly reduced or avoided. The flashlight/continuous light reflector arm and also the reflection element can be comparatively light, for example constructed out of plastic, and therefore have barely any influence on the center of gravity of the camera. The flashlight/continuous light reflector arm according to the invention also allows the flash/continuous light to be centrally mounted on the photographic apparatus even for situations with illumination from the side. In so doing, a flash socket provided on the photographic apparatus can be used directly and no cable or complicated control system needs to be provided for a flash that is mounted to one side of the photographic apparatus. The exposure measurement can also be taken along the camera axis by the flashlight/continuous light unit.

Furthermore, the size of the light source, which is very small in the case of conventional flash units, can most easily be increased by selecting an appropriately sized reflection element. In so doing, more natural illuminations can be achieved and strong shadows prevented.

Moreover, numerous different reflection elements can be provided and used. This significantly increases the flexibility with regard to the lighting situation. Thus for example, smooth, rough, textured, color-modifying, color-neutral and/or reflective, concave, convex, conical, barrel-shaped, round, square, trapezoidal and/or curved reflection elements made out of any materials can be used and/or provided.

Last but not least, a flash/continuous light reflector according to the invention can also be relatively easily and compactly transported together with corresponding reflection elements if needed. Moreover, such a configuration only causes very limited light loss and the lighting situation is therefore controllable in a comparatively defined manner.

The invention and all of its advantageous formations are not only suitable for flashlights on photographic apparatuses, but are also suitable for continuous light units and also for video or film cameras.

The flashlight/continuous light reflector arm can also be formed as or contain a so-called gooseneck; a flexible but semi-rigid arm made out of coiled metal tubing, or something similar.

Numerous configurations are conceivable as a means for fixing a reflection element. For example, simple clips can be used to accommodate reflection elements made out of cardboard, for example, or more complex screw-fitted structures can be provided. The means for fixing a reflection means can also be designed in such a manner that numerous different reflection means can be accommodated.

The fixing arm and/or the means of fixing a reflection means can have an adjustment with which the holding point of the reflector can be moved forward or backward.

The tripod socket or the flash socket are a possible means of fixing the flashlight/continuous light reflector arm to the camera, for example. In the latter case, the contacts for the flash control can be connected through the fixing means, for example by providing flexible metal pins, and a flash socket for accommodating a flash-continuous light. However the fixing arm can also be attached to other parts that are rigidly attached to the photographic apparatus. Thus, for example, a mounting on the objective lens could be implemented. It is also conceivable to mount the fixing arm to part of the flash itself that is rigidly attached to the camera. This has the advantage that the flashlight/continuous light reflector arm can be removed or mounted together with the flash unit with a single hand movement.

If the fixing means is designed so as to be attachable to the flash socket of the photographic apparatus, it lends itself to designing the fixing means in such a manner that the controls for the flash unit are nevertheless available. Thus it is conceivable, for example, to equip the fixing means itself with a flash socket and to simply connect through the electrical connections.

Preferentially, the flashlight/continuous light reflector arm respectively, and the means for fixing a reflection element is designed in such a way that the reflection means can be rotated, tilted and/or swiveled. This offers the possibility of more freedom in the selection of lighting situations. Such tilting, rotating or swiveling devices can be provided on the fixing means, the reflection element itself, the fixing arm or the means by which the reflection means are fixed. The reflector arm can also be designed segmented, for example, so that it can be adjusted.

Preferentially, the flashlight/continuous light reflector arm is designed in such a way that height of the means of fixing a reflection means can be adjusted. This can be achieved, for example, by making the height of the means for fixing a reflection element itself variable, or alternatively, the fixing arm is designed in such a way that it allows the height adjustment of the fixing means for the reflection element. This can be achieved, for example, by means of a so-called gooseneck; a flexible but semi-rigid arm made out of coiled metal tubing.

It is especially advantageous to combine a flashlight/continuous light reflector arm according to the invention with one or more reflection elements. In so doing, the reflection element can be fixedly attached to the flashlight/continuous light reflector arm or the flash reflector arm designed in such a way that the reflection means is interchangeable or detachably fixed.

Preferentially, the reflection element features an especially smooth, reflective surface. The flashlight is especially uniformly distributed through the use of a smooth reflective surface. The use of convex and/or concave reflective surfaces can also be advantageous depending on the requirements.

In a further application of the invention, a photographic apparatus can be equipped with an integrated flashlight, wherein the flash unit is disposed in the photographic apparatus in such a way that the flashlight can be emitted to the side and wherein the photographic apparatus features a fixing arm that can be laterally extended, wherein the fixing arm features a means for fixing a reflection element to the fixing arm and wherein the fixing arm and the means for fixing a reflection element are designed in such a way that the reflection means attached to the mounting means can be positioned on the side alongside the photographic apparatus.

Such a configuration allows the invention to be designed in such a way that it is especially integrated, compact and easy to handle. This is especially useful for compact cameras. Unlike conventional flash units, which are mounted on top of or integrated into the top of the photographic apparatus, the flash unit according to the invention is advantageously mounted to the left or right on the sides. In can be designed such that it can be swiveled/rotated, so that the flash can be aimed directly without the reflection means. The swivel/rotation can be automatically triggered by rotating/sliding the fixing arm and/or the reflection means on or out.

These possible integration locations on the side of the photographic apparatus were previously occupied by the hinges that were needed in order to be able to load the film. Due to the lateral configuration, the flash unit can cast light to the side and illuminate the reflection means without shadowing being created by the body of the photographic apparatus.

The cover of the entire front or rear portion of the camera could serve as a reflection means, which in this case, would be equipped with a suitable reflective foil.

It is also conceivable that a fan-shaped reflector is mounted on the fixing arm by means of the means for fixing a reflection element, and that this reflector comes to rest in a receptacle when the fixing arm is pushed into the photographic apparatus and that merely folds out and if necessary, must be rotated, when the fixing arm is extended. For this purpose, the fixing arm can be designed to be U-shaped and as such, this U-section may provide the receptacle into which the reflection element is received.

It is also possible to provide the integrated flash with cover that can be extended, rotated and/or tilted, and that simultaneously constitutes a reflection element. At the same time, the extending, rotating or tilting mechanism comprises both the fixing arm and the fixing means. Furthermore, when extending the cover, the flash can also be activated, for example via a micro switch. The integrated flash is protected from environmental influences by such a cover. Due to its simultaneous use as a reflection element, the photographic apparatus can be designed to be especially compact.

A further advantageous embodiment is realized by a camera. The photographic apparatus contains an integrated flash unit, wherein the flash unit in the photographic apparatus is arranged in such a way that the flashlight can be emitted on a first side. The flash can thereby be mounted on the side, but can also, for example, be mounted on the photographic apparatus such that it can be rotated, tilted and/or swiveled to the side. Preferentially, it is designed in such a way that it can also be directed forward, for example by tilting, rotating and/or swiveling, in order to directly illuminate the object being photographed.

The photographic apparatus features a reflection means that can be pulled or folded out to the first side and that is designed such that it is bent or at an angle, or can be bent or angled, and hinged via fixing means on the photographic apparatus.

Here, the reflection means is formed as a single integral unit with the fixing arm. It is therefore mostly a broad fixing arm that is formed as a reflection means.

This reflection means is attached to the photographic apparatus by means of fixing means so that it can be folded or extended and retracted. The reflection means is bent or angled in order to allow the laterally emitted flashlight to be redirected in the direction of the object being photographed. This means that the light is usually redirected by approximately 90°.

The reflection means and the means of folding and/or sliding the fixing means are designed in such a way that the reflection means abuts the rear wall or a side wall of the photographic apparatus in a first folding or sliding state, or can be completely accommodated in the photographic apparatus, or a first part can be accommodated in the photographic apparatus and a second part can abut a side wall and/or the back wall and in a second folding or sliding state, can be disposed on the first side of the photographic apparatus such that it can redirect the flashlight emitted by the integrated flash unit to the first side in a forward direction, onto the object being photographed. Moreover, additional folding and/or sliding states may exist, for example to achieve other illuminations. If the reflection means is designed so that it can be bent or angled, it will generally be necessary to angle or bend the reflection means accordingly in order to redirect the flashlight emitted by the integrated flash unit to the first side in a forward direction, onto the object being photographed.

This embodiment, which can be bent or angled, offers the advantage that the user can implement various lightings in the case of differing bends or angles that may be provided and depending on the photographic apparatus, may make a better fit to the photographic apparatus or a simpler folding or sliding mechanism possible.

For example, it is possible to simply slide a completely smooth reflection means from a parallel position directly behind the rear wall or inside the photographic apparatus parallel to the rear wall to the side. In this state, however, the laterally emitted flashlight cannot be effectively redirected onto the object being photographed so that it must be possible to bend or angle at least one, advantageously terminal area of the reflection means.

Alternatively, for example, a terminal section of the reflection means can be designed such that it is angled or bent, and abuts a side wall when in the retracted position, thereby advantageously also serving as a cover for an integrated flash on the side.

An advantageous embodiment may also provide for the flash unit to be activated and/or folded, rotated and/or tilted in the lateral direction when the reflection means is taken out of the first and/or into the second folding and/or sliding state.

An advantageous embodiment may also provide for the flash unit to be deactivated and/or directed towards the front for a direct flash, when the reflection means is placed in the first and/or from the second folding and/or sliding state.

BRIEF DESCRIPTION OF THE DRAWINGS

Other possible embodiments of the invention will be illustrated based on the purely schematic non-limiting figures. Insofar as no dependencies with regard to the individual features are presented, the individual features may also be freely combined with one another or omitted.

The figures show in detail.

MODE(S) FOR IMPLEMENTING THE INVENTION

Figure 1:
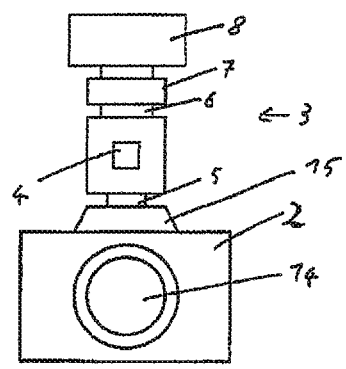
FIG. 1 a traditional combination of a flash unit mounted on a photographic apparatus.

FIG. 1 shows a photographic apparatus 2 with an objective lens 14 and a flash socket 15, on which a flash unit 3 is mounted. The flash unit 3 is fixed to the flash socket 5 via a flash jack 5 (of the photographic apparatus 2). The flash unit 3 features an exposure sensor 4 on the lower part. Moreover, a swivel device 6 is disposed for the lateral rotation of the lamp housing 8. Furthermore, a tilting device 7 is disposed between the lamp housing 8 and swivel device 6 for tilting the lamp housing 8. In this configuration, the flash unit 3 flashes from the direction, from which the photograph is made via the objective lens 14.

Figure 2:
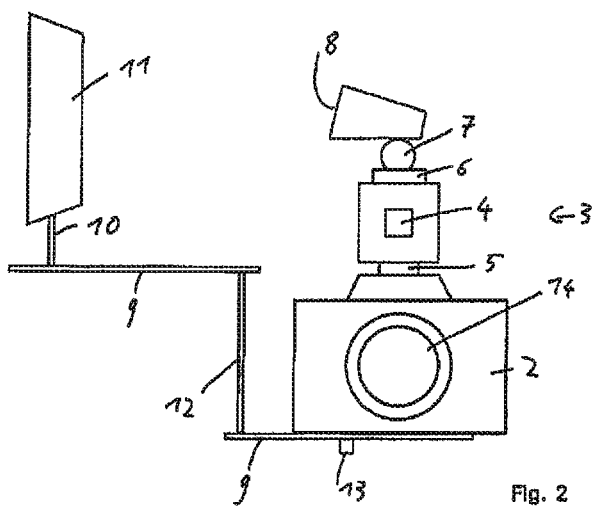
FIG. 2 a flash reflector mounted on a photographic apparatus with a flash unit.

FIG. 2 shows a photographic apparatus 2 on which a flash unit 3 is disposed. A fixing arm 9 is disposed on the lower end of the photographic apparatus 2 via a tripod socket disposed there and a fixing means 13. The fixing arm 9 features two horizontal sections and vertical fixing arm section 12 disposed between those two horizontal sections. Moreover, a means 10 for fixing a reflection element 11 is disposed on the fixing arm 9. The means for fixing 10 are formed in such a way that it is possible to adjust the height of the reflection element 11.

The vertical fixing arm section 12 also serves to set the reflection element 11 to an appropriate height in relation to the flash unit 3. It can be seen that the reflection element 11 is disposed laterally alongside the photographic apparatus 2 and designed in such a way that the flashlight emitted from the lamp housing 8 is directed via the reflection element 11 in the direction of the object being photographed. Furthermore it can be seen that despite the swiveling of the lamp housing 8 with the aid of the swivel device 6, as opposed to the configuration in FIG. 1, the exposure sensor 4 is still directed forward and is oriented relatively near to the objective lens so that it can perform a meaningful light measurement. This allows an optimal control of the amount of light.

Figure 3:
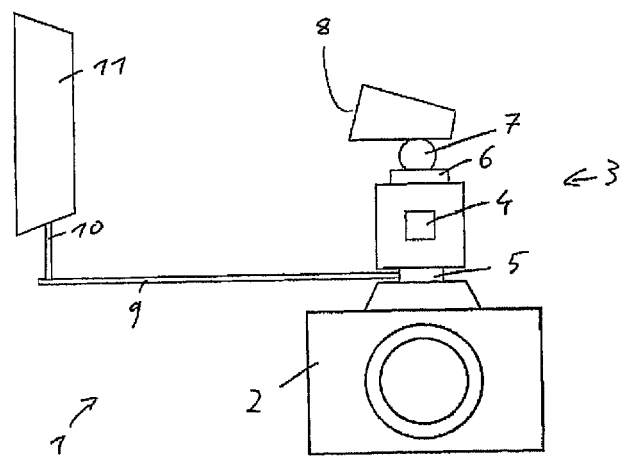
FIG. 3 a flash reflector mounted on a flash unit.

FIG. 3 shows a further embodiment of a flash reflector. In this embodiment, a fixing arm 9 is fixed to a flash socket 5 with the aid of a fixing means (not shown here). A vertical fixing arm section 12 is not provided here, since the fixing arm 9 is attached significantly higher.

Figure 4:
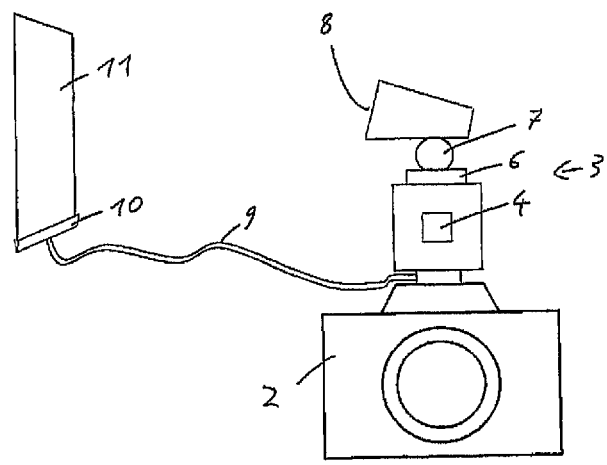
FIG. 4 a flash reflector mounted on a flash unit.

FIG. 4 shows a further embodiment of a flash reflector. In this embodiment, a fixing arm 9 is fixed to a flash socket 5 with the aid of a fixing means (not shown here). A fixing arm 12 is formed in this instance by a gooseneck. The means 10 for fixing a reflection means 11 are formed in this case by a clip.

The reflection means can be positioned especially easily and flexibly due to the gooseneck.

Figure 5:
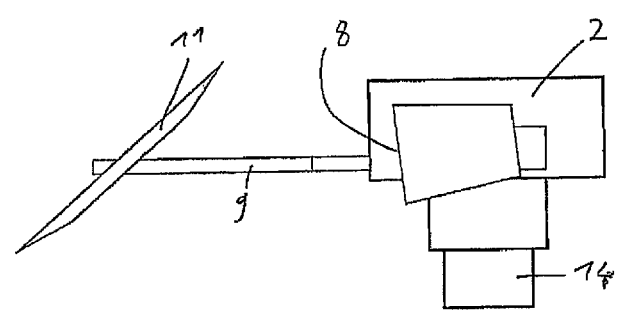
FIG. 5 the configuration in FIG. 2, however from a bird's-eye perspective.

FIG. 5 shows a configuration as in in FIG. 2, however from a bird's-eye view. It can be seen that the reflection means 11 is disposed laterally alongside the photographic apparatus 2 and is at an angle. The lamp housing 8 is not swiveled by precisely 90°, but instead is likewise slightly at an angle resulting in an optimal illumination of the object being photographed. The orientation of the reflection means 11 and of the lamp housing can be adapted according to the individual requirements.

Figure 6:
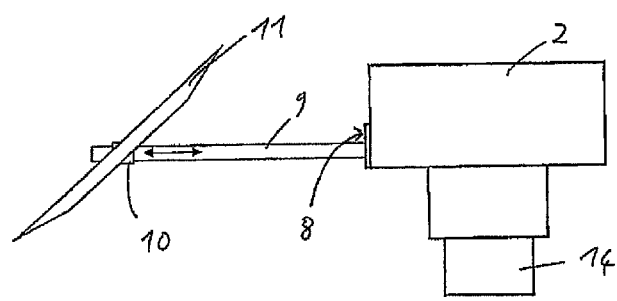
FIG. 6 the configuration in FIG. 2, however from a bird's-eye perspective.

FIG. 6 shows a further embodiment of the invention. Shown in this figure is a photographic apparatus 2 with a laterally integrated lamp housing 8 of a flash unit 3. The fixing arm 9 is designed as an extendable rail (indicated by the double arrow) on which the means 10 for fixing a reflection means is located.

LIST OF REFERENCE DRAWINGS 1. system consisting of a photographic apparatus, flash unit and flash reflector
2. photographic apparatus
3. flash unit
4. exposure sensor
5. flash jack
6. rotating mechanism
7. tilting mechanism
8. lamp housing
9. fixing arm
10. means for fixing a reflection element
11. reflection element
12. vertical fixing arm section
13. fixing means for a tripod socket
14. objective lens
15. flash socket

The invention claimed is:

1. A system comprising:
    a flash unit or a continuous light unit;
    a photographic apparatus, or a film or a video camera;
        where the photographic apparatus, or the film or the video camera has a top wall, a bottom side wall, a front wall, and a rear wall, and further includes a first side wall and a second side wall extending between the top wall and bottom wall;
    a flash socket provided on the top wall of the photographic apparatus or the film or video camera;
        a light fastening device for fixing the flash unit or continuous light unit directly to the flash socket or indirectly to the flash socket on the photographic apparatus or film or video camera;
    wherein the flash unit or continuous light unit includes a lamp housing and an exposure sensor and wherein the light fastening device is disposed in such a way that the flash unit or continuous light unit is attached or is attachable to the photographic apparatus or film or video camera in such a way that the exposure sensor is facing forward along a photographic apparatus axis or a camera axis; and wherein the lamp housing is disposed in such a way that it emits its light in a direction extending at least partially towards and outwardly beyond the first side wall of the photographic apparatus or the film or video camera;
    at least one flashlight or continuous light reflector arm;
    wherein the flashlight or continuous light reflector arm includes:
        a fixing means;
        a fixing arm; wherein the fixing arm is fixed or is fixable to the photographic apparatus or the film or video camera or to a part that is rigidly attached to these by means of the fixing means;
        a reflection element; and
        a means for attaching;
    wherein an edge of the reflection element is attached to the fixing arm by the means for attaching; and wherein the flashlight or continuous light reflector arm is designed in such a way that when the reflector arm is fixed to the photographic apparatus or the film or video camera or to the part that is rigidly attached to these, then the reflection element is positioned or is positionable laterally adjacent the first side wall of the photographic apparatus or to the film or video camera, or to the flash unit or continuous light unit; and between the front and rear walls or forwardly of the front wall or rearwardly of the rear wall.

2. The system according to claim 1, wherein the fixing means is designed in such a way that it is fixed or is fixable to a tripod socket of the photographic apparatus or the film or video camera.

3. The system according to claim 1, wherein the fixing means is designed in such a way that it is fixed or is fixable to the light fastening device of the photographic apparatus or the film or video camera.

4. The system according to claim 3, wherein the light fastening device is a flash socket of the photographic apparatus or the film or video camera.

5. The system according to claim 1, wherein the reflection element includes a smooth, convex or concave reflective surface.

6. The system according to claim 1, wherein the flashlight or continuous light reflector arm is designed in such a way that the reflection element is rotated, tilted or pivoted, or is rotatable, tiltable or pivotable; or is lengthened or shortened or is able to be lengthened or shortened.

7. The system according to claim 6, wherein the means for attaching the edge of the reflection element to the fixing arm on the flashlight or continuous light reflector arm is designed in such a way as to rotate, tilt or pivot the reflection element, or to lengthen or shorten the same.

8. The system according to claim 1, wherein the fixing arm is a gooseneck, that is, a flexible but semi-rigid arm, or that the fixing arm features a section designed as a gooseneck.

9. The system according to claim 8, wherein the gooseneck or section designed as a gooseneck is made out of a coiled metal hose.

10. The system according to claim 1, wherein the light fastening device is disposed on the top wall of the photographic apparatus or the film or video camera.

11. The system according to claim 1, wherein the means for attaching is a clip, screw or clamp.

12. The system according to claim 1, wherein the flash unit is oriented to emit light towards and beyond the first side wall of the camera along a light axis; and wherein the light axis deviates from the camera axis by more than 1 degree toward the first side wall.

13. A photographic apparatus or film or video camera having a top wall, a bottom wall, a front wall, a rear wall, and first and second side walls extending between the top and bottom walls and between the front and rear walls, wherein a camera lens is provided in the front wall; and wherein the photographic apparatus or film or video camera contains an integrated flashlight or a continuous light unit, wherein the flashlight or continuous light unit is disposed in the photographic apparatus or the film or video camera in such a way that the flashlight or continuous light is emitted or is emittable in a direction extending outwardly beyond the first side wall of the photographic apparatus or the film or video camera, and wherein the photographic apparatus or the film or video camera features a fixing arm that is extended or is extendable relative to the first side wall of the photographic apparatus, film or video camera, wherein the fixing arm includes a means for attaching one edge of the reflection element to the fixing arm; and wherein the fixing arm and the means for attaching the reflection element are designed in such a way that the reflection element attached to the means for fixing the reflection element is positioned or is positionable laterally adjacent the first side wall of the photographic apparatus or the film or video camera.

14. The photographic apparatus or film or video camera according to claim 13, wherein the means for attaching is a clip, screw or clamp.

15. A photographic apparatus or film or video camera having a top wall, a bottom wall, a front wall, a rear wall, and first and second side walls extending between the top and bottom walls and between the front and rear walls, wherein a camera lens is provided in the front wall; and wherein the photographic apparatus or film or video camera contains an integrated flashlight or a continuous light unit, wherein the flashlight or continuous light unit is disposed in the photographic apparatus or film or video camera in such a way that the flashlight or continuous light is emitted or is emittable in a direction extending outwardly away from the first side wall of the photographic apparatus or the film or video camera, and wherein the photographic apparatus or the film or video camera includes a reflection means that is pulled or folded or is pullable or foldable out of the first side wall of the photographic apparatus or the film or video camera, wherein that reflection means is formed so that it is curved or made curved, bent or made bent, and is thus hinged on the photographic apparatus or the film or video camera via a fixing means so that in a first folding or sliding state, the reflection means completely abuts the rear wall or the rear wall and the first side wall of the photographic apparatus or of the film or video camera, or the reflection means is completely incorporated in the photographic apparatus or in the film or video camera, or so that an initial part of the reflection means is incorporated in the photographic apparatus or in the film or video camera and a second part of the reflection means abuts the first side wall or the rear wall thereof; and in a second folding or sliding state, an edge of the reflection means is attached to a fixing arm that extends outwardly from the photographic apparatus or the film or video camera in such a way that the reflection means is thus disposed on a first side of the photographic apparatus or of the film or video camera adjacent the first side wall, so that the reflection means deflects flash or continuous light emitted from the integrated flashlight or continuous light unit towards the first side wall into a forward direction and onto the object being photographed or filmed.

16. The photographic apparatus or film or video camera according to claim 15, wherein the means for attaching is a clip, screw or clamp.

17. A system comprising:
a camera having a top wall, a bottom wall, a front wall, a back wall, and first and second side walls;
a lens provided in the front wall, wherein a camera axis is oriented at right angles to the front wall and passes through the lens;
a first mounting bracket provided on the top wall of the camera and a second mounting bracket provided on the bottom wall thereof;
a flash unit engaged with the first mounting bracket; said flash unit including a sensor and a lamp assembly; where the sensor faces forwardly and is aligned with the camera axis; and the lamp assembly is pivotable about a vertical axis oriented at right angles to the camera axis and emits light outwardly beyond one of the first or second side walls of the camera;
a first end of a reflector arm fixedly mounted to the first mounting bracket or to the second mounting bracket;
a fixing means provided at a second end of the reflector arm;
a reflection element engaged with the reflector arm by the fixing means, wherein an edge of the reflection edge is attached to the reflector arm such that the reflection element is positioned or is positionable laterally adjacent one of the first and second side walls of the camera or the flash unit; said reflection element being pivotable about an axis parallel to the vertical axis to position the reflection element so that light is emitted by the flash unit at least partially towards and beyond the one of the first and second side walls and thereby towards the reflection element, and the light will reflect off the reflection element and be directed toward an object positioned in front of the front wall of the camera.

18. The system according to claim 17, wherein the reflector arm is adjustable in length.

19. The system according to claim 17 wherein the reflector arm is a gooseneck arm.

20. The system according to claim 17, wherein the reflector arm includes a first section, a second section, and a third section; and the first section has a first end that is secured to the one of the first or second mounting brackets and is substantially parallel to the bottom wall of the camera; a first end of the second section extends outwardly and upwardly from a second end of the first section and is oriented generally at right angles to the bottom wall of the camera; and a first end of the third section extends outwardly and laterally from a second end of the second section; and the third section is parallel to the first section; and a clip, screw or clamp is engaged with a second end of the third section.

21. The system according to claim 20, wherein the third section of the reflector arm is positioned laterally adjacent the flash unit mounted on the top wall of the camera.

22. The system according to claim 17, wherein the edge of the reflection element is attached to the reflector arm by a clip, screw or clamp.

* * * * *